US010389427B2

(12) United States Patent
Strong et al.

(10) Patent No.: US 10,389,427 B2
(45) Date of Patent: Aug. 20, 2019

(54) METHOD AND APPARATUS FOR AN ACCESS POINT IN A POINT TO MULTIPOINT WIRELESS NETWORK

(71) Applicant: Cambium Networks Ltd, Devon (GB)

(72) Inventors: Peter Strong, Ipplepen (GB); Paul Clark, Paignton (GB); Martin Crowle, Devon (GB)

(73) Assignee: CAMBIUM NETWORKS LTD, Devon (GB)

( * ) Notice: Subject to any disclaimer, the term of this patent is extended or adjusted under 35 U.S.C. 154(b) by 0 days.

(21) Appl. No.: 15/869,883

(22) Filed: Jan. 12, 2018

(65) Prior Publication Data
US 2018/0138964 A1 May 17, 2018

Related U.S. Application Data

(63) Continuation of application No. PCT/GB2016/052102, filed on Jul. 12, 2016.

(30) Foreign Application Priority Data

Jul. 13, 2015 (GB) .................................. 1512183.3

(51) Int. Cl.
*H04B 7/08* (2006.01)
*H04B 7/0408* (2017.01)
(Continued)

(52) U.S. Cl.
CPC ........... *H04B 7/086* (2013.01); *H04B 7/0408* (2013.01); *H04B 7/0617* (2013.01);
(Continued)

(58) Field of Classification Search
CPC .. H04B 7/0686; H04B 7/0408; H04B 7/0871; H04B 7/10; H01Q 21/24; H01Q 25/001; H04W 16/28
See application file for complete search history.

(56) References Cited

U.S. PATENT DOCUMENTS 5,684,491 A * 11/1997 Newman .................. H01Q 3/24
342/372
5,907,816 A 5/1999 Newman et al.
(Continued)

OTHER PUBLICATIONS

International Search Report in PCT Application No. PCT/GB2016/052102, dated Oct. 19, 2016.
(Continued)

*Primary Examiner* — Aristocratis Fotakis
(74) *Attorney, Agent, or Firm* — Brinks Gilson & Lione

(57) ABSTRACT

An access point (1) for use in a point to multipoint wireless network comprises a sector antenna (8) and an antenna array of antenna elements (7), the antenna elements not including the sector antenna, and the antenna elements being arranged to receive signals from the same sector as the sector antenna. A first beamformer (10) is configurable to form a first beam (11) from signals received at the antenna array and a selector switch (5) is switchable to at least a first state in which signals received at the sector antenna (8) are connected to a first receiver (2), and a second state in which signals received from the first beamformer (10) are connected to the first receiver (2). A scheduler is configured to set the selector switch (5) to the first state for at least a first receive timeslot and to the second state for at least a second receive timeslot.

19 Claims, 11 Drawing Sheets

(51) Int. Cl.
*H04B 7/06* (2006.01)
*H04B 7/10* (2017.01)

(52) U.S. Cl.
CPC ......... *H04B 7/0822* (2013.01); *H04B 7/0871* (2013.01); *H04B 7/10* (2013.01)

(56) References Cited

U.S. PATENT DOCUMENTS

| | | | |
|---|---|---|---|
| 6,167,286 A | 12/2000 | Ward et al. | |
| 6,314,305 B1 * | 11/2001 | Solondz | H01Q 1/246 342/373 |
| 2001/0016504 A1 * | 8/2001 | Dam | H04W 16/28 455/562.1 |
| 2003/0025633 A1 * | 2/2003 | Cai | G01S 3/043 342/378 |
| 2005/0057421 A1 * | 3/2005 | Mohamadi | H01Q 3/26 343/853 |
| 2009/0253387 A1 * | 10/2009 | Van Rensburg | H01Q 3/40 455/90.2 |
| 2010/0313232 A1 * | 12/2010 | Norin | H04H 20/63 725/110 |
| 2011/0026418 A1 * | 2/2011 | Bollea | H01Q 1/2258 370/252 |
| 2014/0009347 A1 | 1/2014 | Bertin et al. | |
| 2014/0120966 A1 * | 5/2014 | Fischer | H04K 3/822 455/500 |

OTHER PUBLICATIONS

Written Opinion of the International Searching Authority in PCT Application No. PCT/GB2016/052102, dated Oct. 19, 2016.

* cited by examiner

METHOD AND APPARATUS FOR AN ACCESS POINT IN A POINT TO MULTIPOINT WIRELESS NETWORK

CROSS-REFERENCE TO RELATED APPLICATIONS

This application is a continuation of International Patent Application No. PCT/GB2016/052102, filed Jul. 12, 2016, designating the United States and published in English, which claims priority to United Kingdom Patent Application No. GB 1512183.3, filed Jul. 13, 2015, the entire disclosures of each of which are incorporated herein by reference.

TECHNICAL FIELD

The present invention relates generally to an access point in a point to multipoint wireless network and to methods of operating the access point, and more specifically, but not exclusively, to provision of a beamformer in addition to a sector antenna for use on reception, and a selector switch arranged to connect the sector antenna and/or the beamformer to receivers at the access point.

BACKGROUND

Modern wireless communications networks are typically placed under great demands to provide high data capacity within the constraints of the allocated signal frequency spectrum. In cellular wireless communications networks, capacity may be increased by re-using frequencies between cells, typically according to a predetermined frequency re-use pattern. A fixed wireless access system may comprise a base station, which may be referred to as an access point, typically mounted on an antenna tower, and a number of subscriber modules installed at customer premises. The access point may be equipped with sector antennas, each sector antenna being used to transmit and receive with a respective cell. Capacity may be further increased within a cell by steering respective beams towards specific user equipments to allow communication between the access point with improved gain and/or reduced interference reception in comparison with a sector antenna. The access point may be equipped with an antenna array and a beamformer for each sector, for forming beams for communication with each respective subscriber module.

However, it may be a regulatory requirement to detect radar transmissions in each sector, so that transmissions may be avoided if radar pulses are detected, typically by re-tuning transmissions to another frequency in so-called Dynamic Frequency Selection (DFS) systems. This may be difficult to achieve reliably if a beamformer is used on reception within a sector. Furthermore, if the beamformer is being updated iteratively, for example by perturbation, it is possible that beams may be tried in the perturbation process that may degrade reception performance so that data may potentially be lost.

It is an object of the invention to mitigate the problems of the prior art.

BRIEF SUMMARY

In accordance with a first aspect of the invention there is provided an access point for use in a point to multipoint wireless network comprising the access point and a plurality of subscriber modules, the access point comprising:

a sector antenna arranged to receive signals from a sector of an area of coverage of the access point;

an antenna array of antenna elements, the antenna elements not including the sector antenna, and the antenna elements being arranged to receive signals from the same sector as the sector antenna;

a first beamformer configurable to form a first beam from signals received at the antenna array;

a selector switch switchable to at least a first state and a second state, wherein, in the first state of the selector switch, signals received at the sector antenna are connected to a first receiver, and in the second state of the selector switch, signals received from the first beamformer are connected to the first receiver; and a scheduler configured to set the selector switch to the first state for at least a first receive timeslot and to set the selector switch to the second state for at least a second receive timeslot.

This allows selection between reception from a sector antenna and a beamformer for a first receiver, according to the function of the receiver in a respective timeslot. For example, the first receiver may be configured for radar detection in the first timeslot, receiving from the sector antenna, and the first receiver may be configured for reception of data from a subscriber module in the second timeslot, receiving from the first beamformer.

In an embodiment of the invention, the first beamformer comprises a plurality of step-wise controllable phase shift arrangements, each phase shift arrangement being for controlling the phase and not amplitude of signals received from a respective antenna element of the antenna array. This has been found to provide an economical and effective implementation of a beamformer. This may provide effective forming of a narrow beam to increase gain and reject interference but may give limited capability of producing a wider beam. A wider beam may be provided by the sector antenna.

In an embodiment of the invention, each phase shift arrangement is controllable in steps of at least pi/4 radians.

In an embodiment of the invention, each phase shift arrangement is controllable in steps of pi/2 radians.

It has been found that a surprisingly coarse quantisation of the phase shift may be used to provide a beam giving a useful improvement in signal to interference ratio, while allowing a simple, economical and low loss implementation of a beamformer.

In an embodiment of the invention, at least one of the first and second receivers is a superheterodyne receiver. This allows rejection of interference in the frequency domain in addition to the rejection of interference in the spatial domain by means of the beamformer.

In an embodiment of the invention, the sector antenna is arranged to receive signals at a first polarisation and at a second polarisation, different from the first polarisation;

the antenna array is arranged to receive signals at a third polarisation and at a fourth polarisation, different from the third polarisation;

the first beamformer is configurable to form a first beam from the signals received at the antenna array at the third polarisation; and the access point comprises a second beamformer configurable to form a second beam from signals received at the antenna array at the fourth polarisation; and wherein the selector switch is configured such that in the first state of the selector switch, the signals received at the sector antenna at the first polarisation are connected to a first receiver and the signals from the second beamformer are connected to a second receiver, and in the second state of the selector switch, the signals received from the first beamformer are connected to the first receiver and the signals received at the sector antenna at the second polarisation are connected to the second receiver.

This allows each receiver to be connected to either a beamformer or a sector antenna, such that when one receiver is connected to a sector antenna, the other receiver is connected to a beamformer. This provides an efficient implementation allowing for simultaneous reception using a beamformer and a sector antenna. For example, radar may be detected using a sector antenna while receiving a signal from a subscriber module using a beamformer, or one beamformer may be adapted, exploring possibly unsatisfactory weightsets, while a sector antenna is used to maintain a radio link.

In an embodiment of the invention, the first polarisation is the same as the third polarisation, and the second polarisation is the same as the fourth polarisation. The first polarisation may be orthogonal to the second polarisation. For example, the first and fourth polarisations may be nominally vertical, and the second and third polarisations may be nominally horizontal.

In accordance with a second aspect of the invention, there is provided a method of operating an access point in a point to multipoint wireless network comprising the access point and a plurality of subscriber modules, the access point comprising a first beamformer and a second beamformer, the method comprising:

receiving signals at a sector antenna from a sector of an area of coverage of the access point;

receiving signals at an antenna array of antenna elements, the antenna elements not including the sector antenna, the antenna elements being arranged to receive signals from the same sector as the sector antenna;

configuring a first beamformer configurable to form a first beam from signals received at the antenna array;

setting a selector switch to first state for at least a first receive timeslot and setting the selector switch to the second state for at least a second receive timeslot, wherein, in the first state of the selector switch, signals received at the sector antenna are connected to a first receiver, and in the second state of the selector switch, signals received from the first beamformer are connected to the first receiver.

In an embodiment of the invention, the method comprises:

receiving signals at the sector antenna at a first polarisation and at a second polarisation, different from the first polarisation;

receiving signals at the antenna array at a third polarisation and at a fourth polarisation, different from the third polarisation;

configuring the first beamformer to form a first beam from the signals received at the antenna array at the third polarisation;

configuring a second beamformer to form a second beam from signals received at the antenna array at the fourth polarisation; and controlling the selector switch to:

in the first timeslot, connect the signals received at the sector antenna at the first polarisation to a first receiver and connect the signals from the second beamformer to a second receiver, and in the second timeslot, connect the signals received from the first beamformer to the first receiver and connect the signals received at the sector antenna at the second polarisation to the second receiver.

In an embodiment of the invention, the method comprises, in the first receive timeslot, configuring the first receiver to maintain a radio link from a given subscriber module to a data network and adapting a weightset of the second beamformer to improve the signal quality received at the second receiver.

This allows the weightset of a beamformer to be adapted by exploring states including states which may make reception worse without impacting maintenance of a radio link with a given subscriber module.

In an embodiment of the invention, the method comprises, while the selector switch is in the first state, detecting radar using the first receiver while the second receiver is configured to receive data from the given subscriber module using the second beamformer.

This allows a beam to be steered to a subscriber module to give good quality reception, while allowing reliable radar reception within a sector.

Further features of the invention will be apparent from the following description of preferred embodiments of the invention, which are given by way of example only.

DETAILED DESCRIPTION

By way of example, embodiments of the invention will now be described in the context of a fixed wireless access system operating a time division duplex system based on IEEE 802.11 standards at carrier frequencies typically between 5 and 6 GHz. However, it will be understood that this is by way of example only and that other embodiments may involve other wireless systems and frequencies, and embodiments are not restricted to a specific frequency band of operation or a specific standard, and may involve operation in licensed or unlicensed bands.

Figure 1:
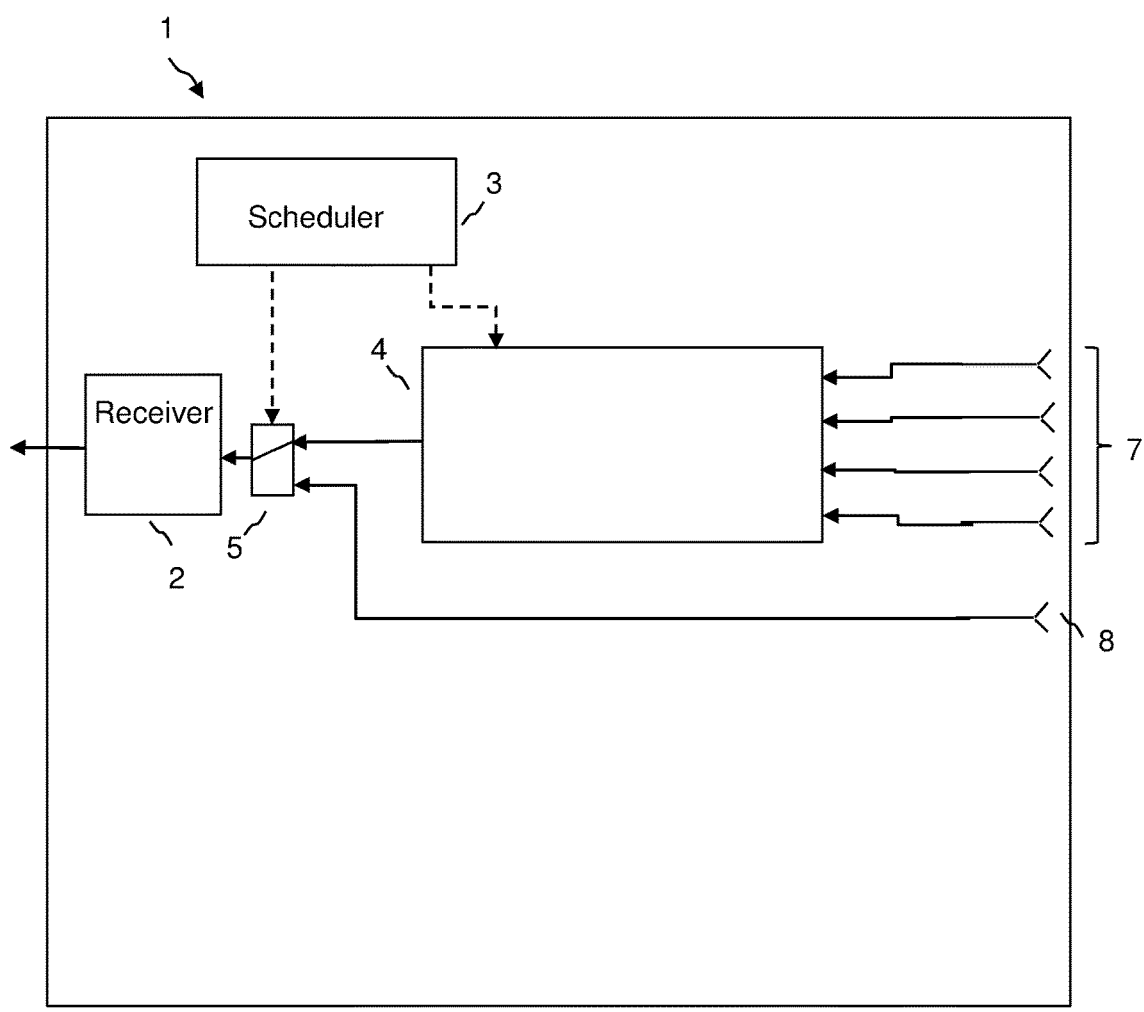
FIG. 1 is a schematic diagram showing an access point having a sector antenna, a first receive beamformer and a selector switch in an embodiment of the invention.

FIG. 1 is a schematic diagram showing an access point 1 according to an embodiment of the invention for use in a point to multipoint wireless network comprising the access point and a plurality of subscriber modules. In a fixed wireless access system the subscriber module may be typically mounted to a structure such as a building, typically on the outside of a building in a position that gives good radio reception to an access point. The access point 1 may be located at a convenient point to serve a number of subscriber units. For example the access point, or the antennas for the access point, may be mounted on an antenna tower, and may provide Internet access to a neighbourhood. The access point 1 comprises a sector antenna 8 arranged to receive signals from a sector of an area of coverage of an access point. The sector antenna is typically arranged to receive signals within an angular range in azimuth of approximately 90 degrees, for a four sectored approach. Other numbers of sectors may be used, for example the sector antenna may be configured to give coverage of approximately 120 degrees in a 3 sectored approach, or 60 degrees in a six sectored approach. The access point 1 also comprises an antenna array 7, the antenna array being an array of antenna elements arranged to receive signals from the same sector as the sector antenna. Typically, the sector antenna is not an antenna element of the array.

A sector antenna may, for example, be a patch antenna or a single column of patch antennas, with respective feed networks combining the signals from the patch antennas to give signals received at vertical and horizontal polarisations respectively. Each element of the antenna array may also be a patch antenna or a column of antenna elements with respective feed networks for signals received at vertical and horizontal polarisations.

As shown in FIG. 1, the access point comprises a first beamformer 4, which is configurable to form a first beam from signals received at the antenna array. The first beamformer is typically arranged to be able to steer a beam within the same angular sector as the sector antenna. The access point comprises a selector switch 5 switchable to at least a first state and a second state. In the first state of the selector switch, signals received at the sector antenna 8 are connected to a first receiver 2, and in the second state of the selector switch, signals received from the first beamformer 4 are connected to the first receiver 2. A scheduler 3 is configured to set the selector switch to the first state for at least a first receive timeslot and to set the selector switch to the second state for at least a second receive timeslot. The scheduler may also control a weightset to be applied to the beamformer for a given timeslot. This allows selection between reception from a sector antenna and a beamformer for a first receiver, according to the function of the receiver.

For example, the first receiver may be configured for radar detection in the first timeslot and reception from the sector antenna may be preferable, and the first receiver may be configured for reception of data from a subscriber module in the second timeslot, and reception from the first beamformer may be preferable.

Figure 2:
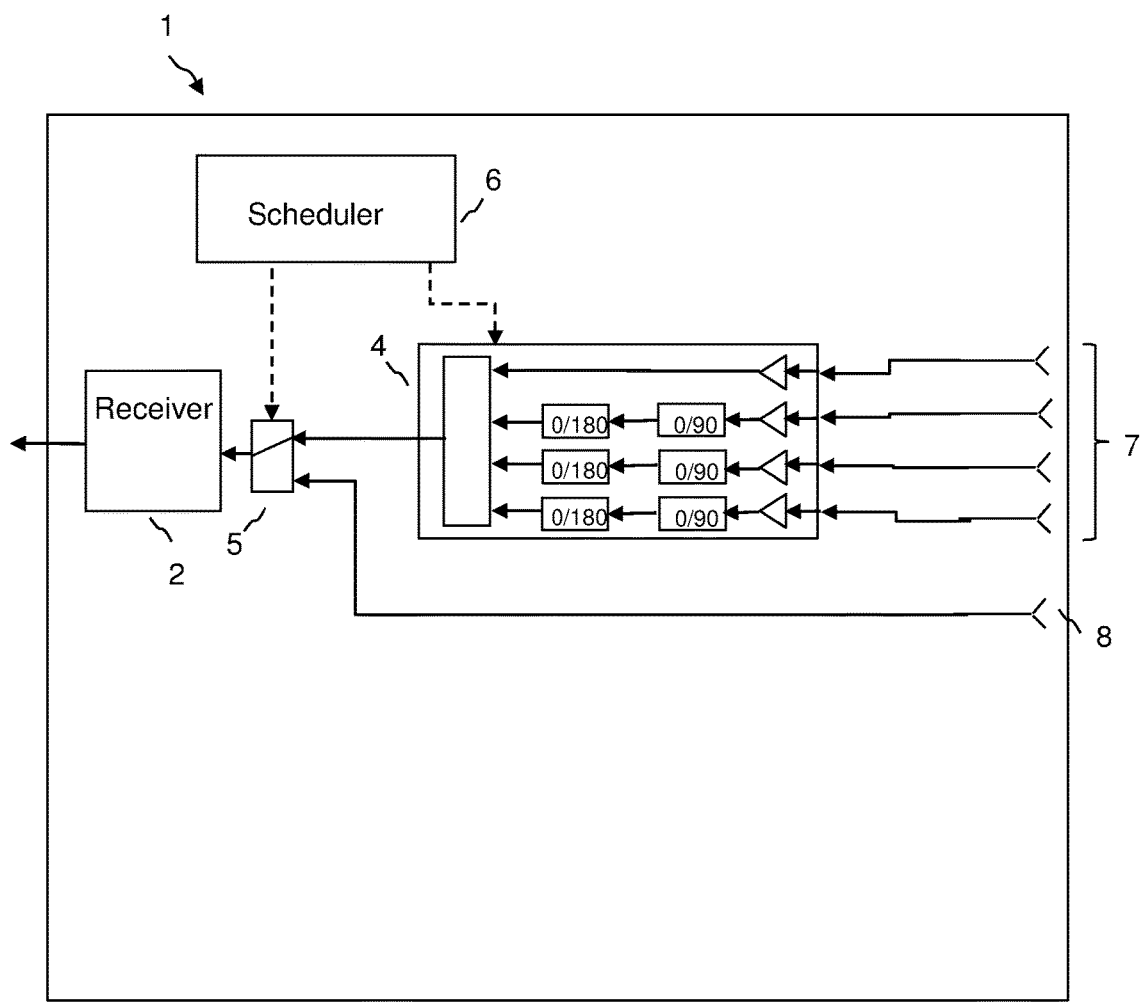
FIG. 2 is a schematic diagram showing an access point having a sector antenna, a first receive beamformer and a selector switch in an embodiment of the invention, in which the beamformer comprises phase shifter elements.

As shown in FIG. 2, the first beamformer 4 may comprise a plurality of switchable phase shift elements. This allows an efficient implementation of the beamformer. The beamformer may have only phase shifting elements and no amplitude adjusting elements. The beamformer comprises a plurality of step-wise controllable phase shift arrangements, each phase shift arrangement being for controlling the phase and not amplitude of signals received from a respective antenna element of the antenna array. Each phase shift arrangement may be controllable in steps of at least pi/4 radians, and in the example of FIG. 2 each phase shift arrangement is controllable in steps of pi/2 radians. As shown in FIG. 2, each beamformer may have four antenna element inputs, but more or fewer element inputs may be provided. One element may be used as a clamped element as shown, without phase control, or optionally all the elements may have phase control. As shown in FIG. 2, each phase shift arrangement may comprise a 0/90 degree phase shifter, which is settable to either nominally zero degrees or nominally 90 degrees (pi/2 radians) transmission phase relative to an arbitrary reference phase. The 0/90 degree phase shifter may be in series with a 0/180 degree phase shifter as shown. This arrangement is relatively low loss and may be controlled to give steps of nominally 90 degrees. The accuracy of the phase shift may be fairly low: +/−10% or +/−20% phase accuracy may be sufficient, for example.

A 0/90 or 0/180 degree phase shifter may be implemented by an RF switch, which is arranged to switch between two delay lines of appropriate length to give the desired phase shift at an operating frequency, and a combiner to combine the signals from the delay lines, for example a Wilkinson combiner. Alternatively, two single pole two throw RF switches could be used to switch either one or the other delay line into the signal path. A two switch arrangement may have lower loss but higher in cost.

It has been found that a surprisingly coarse quantisation of the phase shift, for example controllability in 90 degree steps, may be used to provide a beam giving a useful improvement in signal to interference ratio, while allowing a simple, economical and low loss implementation of a beamformer.

The beamformer may not be suitable for forming a beam which has the same beam width as the beam from the sector antenna. So, for some applications, such as radar detection in a dynamic frequency selection (DFS) system, the beamformer may not be suitable. This may be the case, in particular, if the phase and not the amplitude of each element of the beamformer is controllable. This arrangement may not allow reception from only one element of the antenna array, which may be expected to give a broader beam. The arrangement of FIG. 1 allows the use of a simple and economical beamformer implementation to provide a beam to improve the signal to interference ratio when receiving a signal from a subscriber module, and to allow the use of a sector antenna for reception for applications, such as radar detection for DFS, for which the beamformer may not be suitable.

Figure 3:
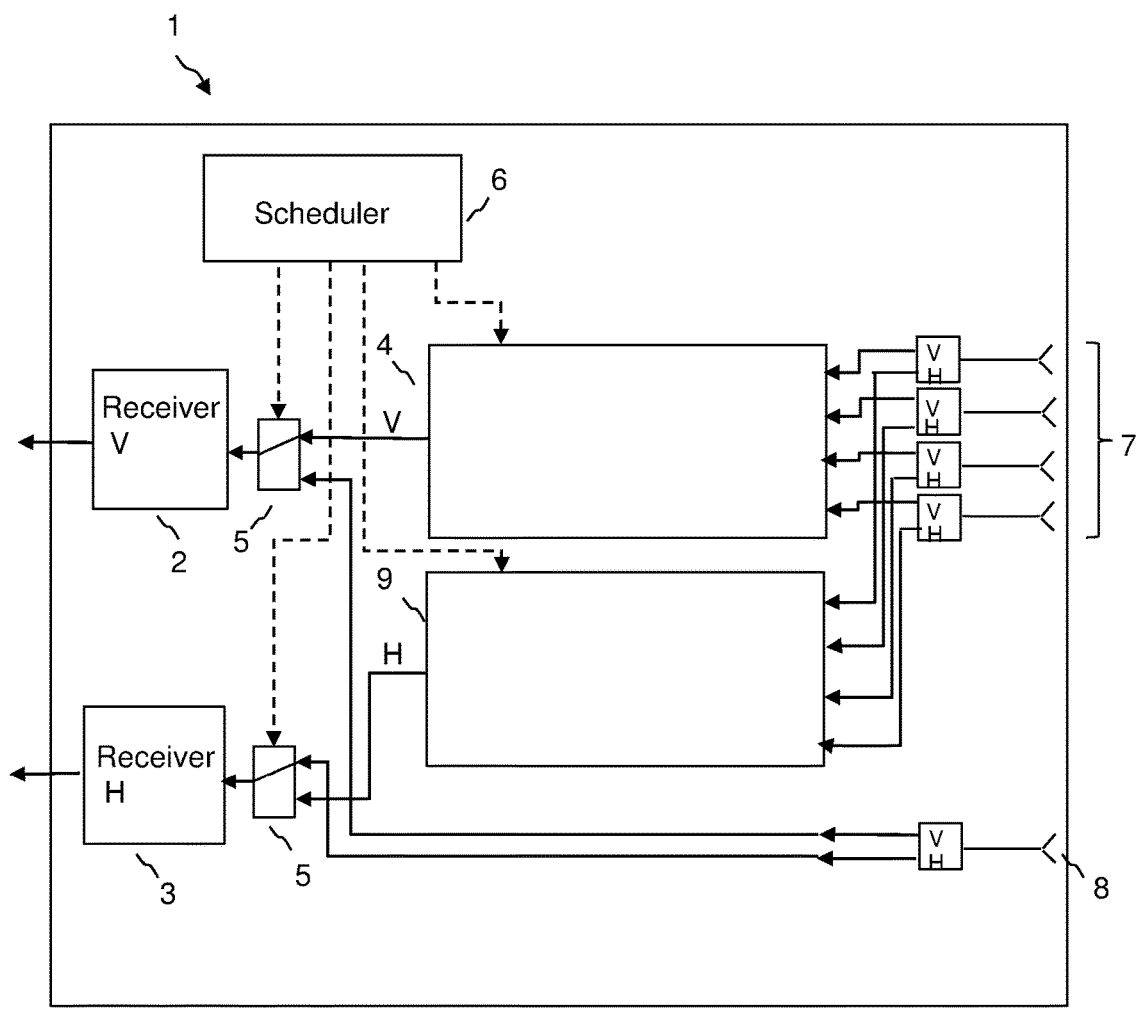
FIG. 3 is a schematic diagram showing an access point having a sector antenna, a first and second receive beamformer and a selector switch in an embodiment of the invention.

FIG. 3 shows an embodiment of the invention in which an access point 1 comprises a sector antenna 8 arranged to receive signals at a first polarisation, in this example nominally vertical polarisation, V, and at a second polarisation, different from the first polarisation and which may be orthogonal to the first polarisation, in this example nominally horizontal polarisation, H. The access point 1 also comprises an antenna array 7 arranged to receive signals at a third polarisation, in this example V and at a fourth polarisation, different from the third polarisation, in this example H. The antenna array is typically arranged to be able to steer a beam within the same angular sector as the sector antenna. The polarisations of the sector antenna need not be the same as those of the antenna array, but they may be the same.

The access point 1 comprises two beamformers, one for each polarisation. The first beamformer 4 is configurable to form a first beam from signals received at the antenna array 7 at the third polarisation, in this example V, and the second beamformer 9 is configurable to form a second beam from signals received at the antenna array 7 at the fourth polarisation, in this example H. The access point has a selector switch 5, which is switchable between a first state and a second state. The selector switch may comprise two switch elements as shown, in a two pole two throw type arrangement as illustrated. In the first state, the signals received at the sector antenna at the first polarisation, in this example V, are connected to a first receiver 2 and the signals from the second beamformer 9, in this example at H polarisation, are connected to a second receiver 3. In the second state, the signals from the first beamformer 4, in this example at V polarisation, are connected to the first receiver 2 and signals received at the sector antenna 8, at the second polarisation, in this example H, are connected to the second receiver 3. The first receiver 2 may be referred to as Receiver V, for receiving signals received at vertical polarisation from either the sector antenna or the first beamformer 4, depending on the state of the selector switch 5. The second receiver 3 may be referred to as Receiver H, for receiving signals received at horizontal polarisation from either the sector antenna or the second beamformer 9, depending on the state of the selector switch 5.

This arrangement allows each receiver to be connected to either a beamformer or a sector antenna, such that when one receiver is connected to a sector antenna, the other receiver is connected to a beamformer. This provides an efficient implementation allowing for simultaneous reception using a beamformer and a sector antenna. For example, radar may be detected using a sector antenna while receiving a signal from a subscriber module using a beamformer, or one beamformer may be adapted, for example during an acquisition phase, exploring possibly unsatisfactory weightsets, while a sector antenna is used to maintain a radio link.

The selector switch 5 may be under control of a scheduler 6 at the access point, so that an appropriate switch state may be selected for a given subscriber module from which signals are being received in a given timeslot. This allows a selection between the use of either a sector antenna or a beamformer to be made for each respective subscriber module and for each respective timeslot, for example in a time division duplex (TDD) and/or time division multiple access (TDMA) protocol.

In many applications, a signal from a subscriber module, or a radar, may be received with satisfactory signal to noise ratio on either polarisation. If a specific polarisation is favoured for reception from a specific subscriber module, for example because the subscriber module is arranged to transmit at that polarisation or on the basis of previous measurements of signal quality on each polarisation, then the favoured polarisation may be selected for reception of data from the subscriber module under control of the scheduler. The selector switch may be controlled by the scheduler to select either a beamformer or the sector antenna for reception, and the appropriate receiver, for example V or H, can be selected also under control of the scheduler. The selected receiver may be used for data reception from the subscriber module for connection to a data network such as the Internet, for the timeslot allocated to that subscriber module.

For example, for a given subscriber module, an adapted weightset may not available, or may be out of date, and it may be required to adapt a weightset for the beamformer for use on, say, V polarisation. This may be, for example, during an acquisition mode, for example on power up. The adaptation process may potentially temporarily make reception worse, as weightsets are explored. So, while the weightset is being adapted, data may be received from the given subscriber module on the other polarisation, H, which may give satisfactory performance to receive data to maintain the link. Once the weightset is adapted, the preferred polarisation V may be selected and the beamformer may be used on V polarisation for reception of data.

So, in a first receive timeslot, or in more than one timeslot, the first receiver may be configured to maintain a radio link from a given subscriber module to a data network using the sector antenna with the selector switch in the first state, and the second receiver may be used to measure signal quality so that a weightset of the first beamformer may be adapted to improve the signal quality received at the second receiver.

In a second receive timeslot, or in more than one timeslot, the second receiver may be used to maintain a radio link from the given subscriber module to a data network, and a weightset of the first beamformer may be adapted to improve the signal quality received at the first receiver.

In a subsequent receive timeslot or timeslots, for signals from the given subscriber module, the selector switch may be set to connect the first beamformer to the first receiver and the second beamformer to the second receiver. This allows both polarisations to be received using respective beamformers, so that either signals received on V or H, or a combination of both, may be used to receive data from a subscriber module.

The selector switch may also be set to connect both polarisations from the sector antenna to respective receivers in some modes of operation, for example for radar detection.

For example, during an acquisition mode, the scheduler may, in a first timeslot, control the selector switch to connect the signals received at the sector antenna at the first polarisation to a first receiver and connect the signals from the second beamformer to a second receiver, and in a second timeslot, connect the signals received from the first beamformer to the first receiver and connect the signals received at the sector antenna at the second polarisation to the second receiver. This allows the first and second beamformers to be adapted off-line from reception of payload data.

Then, subsequently, the scheduler may control the selector switch to connect the first beamformer to the first receiver, and the second beamformer to the second receiver, once acquisition mode is completed and the beamformers have been adapted. This allows either signals received on V or H, or a combination of both, to be used to receive live payload data from a subscriber module in a data mode. Periodically the beamformers may be re-adapted, in which case the selector switch may be set to the first or second state again, as in acquisition mode.

The selector switch 5 may be an analogue switch, or a pair of analogue switch elements, for example a FET (Field Effect Transistor) or PIN (P-type Intrinsic N-type) diode radio frequency or intermediate frequency switch elements, or other semiconductor or electromechanical technology, or the selector switch may be implemented in the digital domain if it is preceded by analogue to digital converters. In the schematic representations of FIGS. 1 to 4, no frequency translation is shown, but it should be understood that the components shown may work at radio frequency, intermediate frequency, or baseband. In particular, the selector switch may operate at radio frequency, intermediate frequency or at digital baseband.

In one example of a beamformer arrangement, there may be eight antenna elements, each of which being a patch antenna having a first output for vertically polarised received signals and a second output for horizontally polarised receive signals. Each antenna element would be connected to two low noise amplifiers, one for each of vertical and horizontal polarisation. Fourteen phase shifter arrangements would be provided, seven for each beamformer, one element for each beamformer being a clamped element without phase control.

Figure 4:
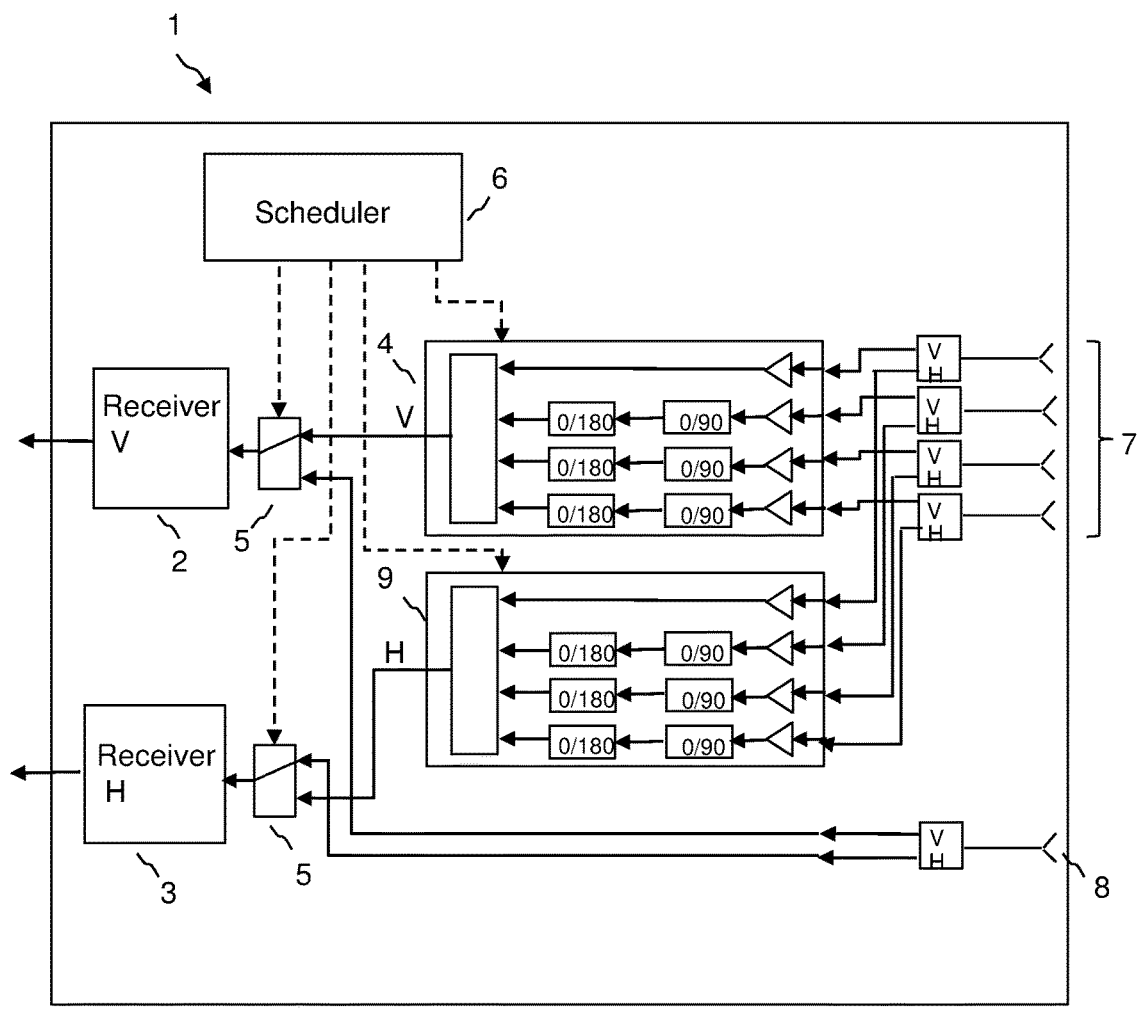
FIG. 4 is a schematic diagram showing an access point having a sector antenna, a first and second receive beamformer and a selector switch in an embodiment of the invention, in which the beamformer comprises phase shifter elements.

FIG. 4 shows that the first and second beamformers may each comprise a plurality of step-wise controllable phase shift arrangements, each phase shift arrangement being for controlling the phase and not amplitude of signals received from a respective antenna element of the antenna array. The phase shift elements of the first and second beamformers may be quantised as described in connection with FIG. 2, with, for example, 90 degree or 45 degree steps.

Figure 5:
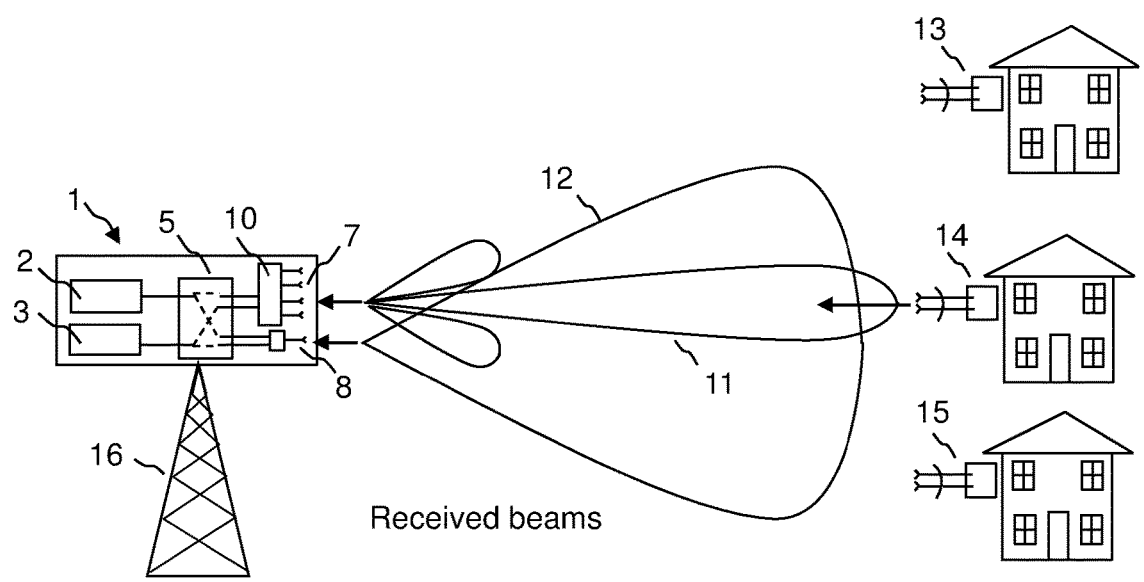
FIG. 5 is a schematic diagram showing received beams at the access point in an embodiment of the invention.

FIG. 5 illustrates operation of an access point 1 according to an embodiment of the invention in a point to multipoint wireless network comprising the access point 1 and a plurality of subscriber modules 13, 14, 15. The access point 1 comprises a first beamformer and a second beamformer, the first and second beamformer being shown in FIG. 2 as a beamformer arrangement 10. Signals are received at the antenna array 7 at two polarisations, typically V and H, and the antenna array is connected a first beamformer, typically for the V polarisation signals, and a second beamformer, typically for H polarised signals. In the example shown, one of the beamformers connected to the antenna array 7 is controlled to produce a beam 11 towards a subscriber module 14, for receiving signals from the subscriber module 14.

Signals are received at a sector antenna 8 at two polarisations, a first polarisation, for example V, and at a second polarisation, for example H. The selector switch 5 is used to switch between a first state in which signals received at the sector antenna 8 at the first polarisation, V, are connected to a first receiver 2 and signals received at the antenna array at the fourth polarisation, H, formed into a second beam by the second beamformer, are connected to a second receiver 3, and a second state in which signals received at the sector antenna 8 at the second polarisation, H, are connected to the second receiver 3 and signals received at the antenna array 7 at the third polarisation, V, formed into a first beam by the first beamformer, are connected to the first receiver 2. In this example, the first receiver 2 receives signals received with V polarisation from either the sector antenna 8 or from the beamformer arrangement 10, and the second receiver 3 receives signals received with H polarisation from either the sector antenna 8 or from the beamformer arrangement 10, such that one receiver is receiving from the sector antenna while the other is receiving from the beamformer arrangement.

A receiver such as the first receiver 2 or second receiver 3 typically includes a series of radio frequency and baseband components for reception, known as a reception chain. The selector switch 5 may be controlled by a command sent from a scheduler, the scheduler typically being at the access point 1. The scheduler may be implemented as all or part of a processor or controller. The scheduler need not be an entity physically located at an access point but could be a function of a processor located remotely from the access point, for example at a node of a data network comprising several access points. The processor or controller comprising the scheduler may comprise at least one data processor, and at least one memory including computer program code, and/or may comprise a logic array such as a Field Programmable Gate Array.

The subscriber modules 13, 14, 15 shown in FIG. 5 may have antennas which have an aperture defined for example by a reflector, and each antenna element may comprise a probe for receiving and/or transmitting a respective polarisation from/to the aperture. The antenna is typically installed so as to align the peak of the transmit/receive radiation pattern in the direction of the access point 1, which is typically installed on a tower 16. A command sent to each subscriber module may comprise a map indicating a scheduling of radio resource and/or polarisation to the subscriber module as a function of time. The map may indicate respective allocations to several subscriber units as a function of time, typically all subscriber units served by an access point. The map may indicate, for example, time, polarisation, and/or frequency allocation for transmission and/or reception. The scheduling of radio resource and polarisation may be updated periodically, the period between updates being determined by a scheduler at the access point. The sector antenna may produce a receive beam 12, which is typically has a wider beamwidth, for example wider by a factor of 4 or more, than the beamwidth produced by a beamformer.

Figure 6:
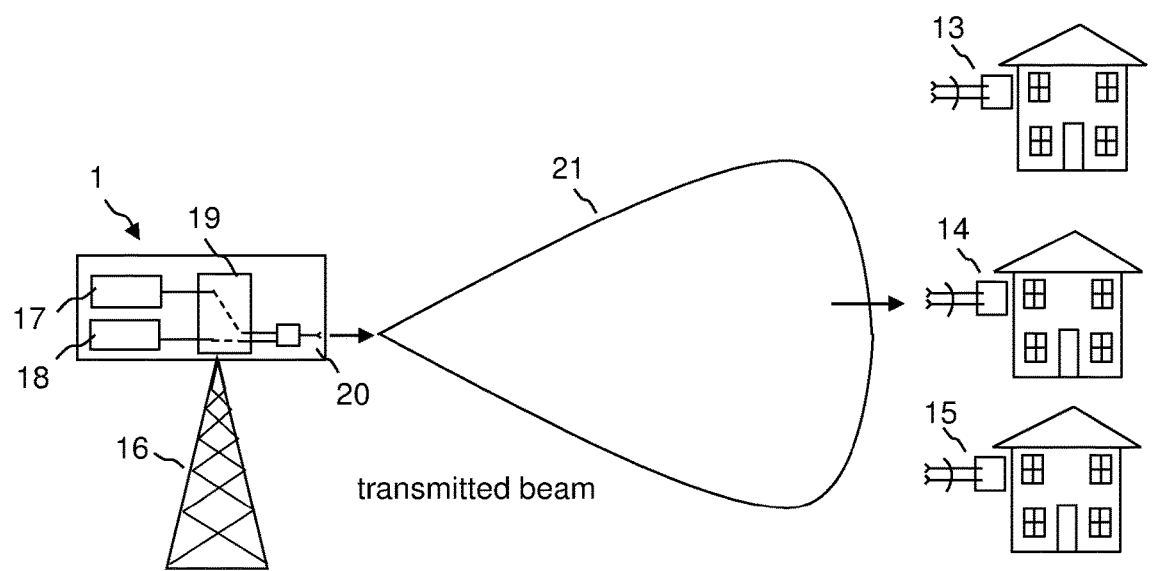
FIG. 6 is a schematic diagram showing a transmitted beam from the access point in an embodiment of the invention.

FIG. 6 shows a beam 21 transmitted by a sector antenna 20 of the access point 1. The sector antenna used for transmission may be the same antenna as the sector antenna 8 used for reception. A time division duplex protocol may be used, so that signals are transmitted and received at the same frequencies at different times. Typically a time division multiple access protocol is also used, so that each subscriber module will have an allocated transmission and reception time slots. As shown in FIG. 6, in an embodiment of the invention, a beamformer may not be provided for transmission from the access point, only for reception. A first transmission chain 17 and a second transmission chain 18 may be provided, each being connected to the sector antenna 20 to transmit at a respective polarisation, typically V or H. A transmission selector switch 19 may be provided to select one or other, or both, polarisations for transmission, typically under control of the access point scheduler.

Figure 7:
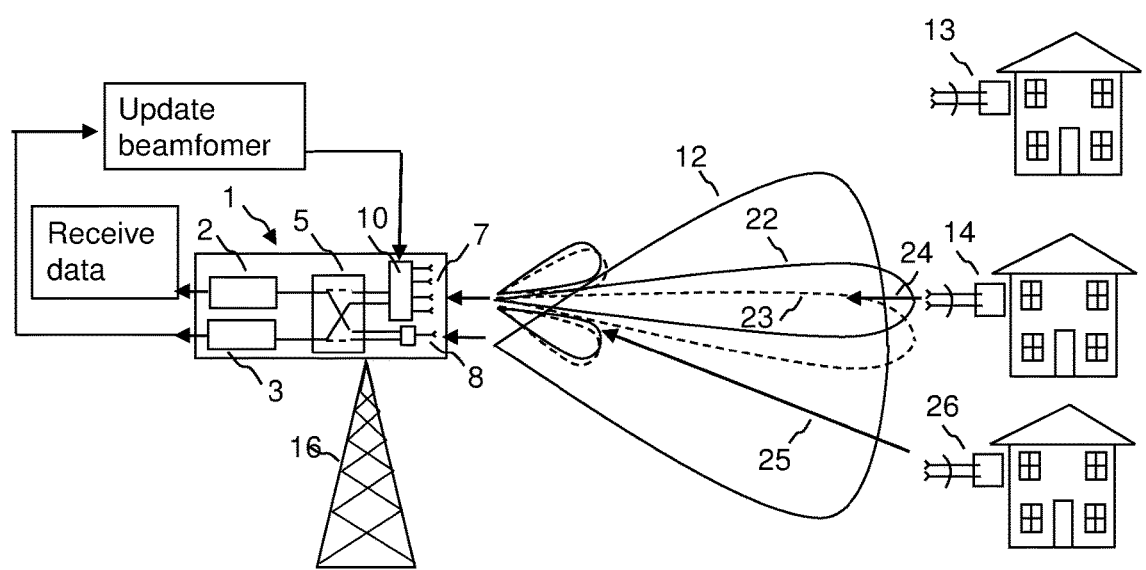
FIG. 7 is a schematic diagram showing an access point configured to receive data using a sector antenna while updating a beamformer in an embodiment of the invention in an acquisition mode.

FIG. 7 shows an access point 1 configured to receive data using a sector antenna while updating a beamformer in an embodiment of the invention. When the selector switch 5 is in the first state, the first receiver 2 is configured to maintain a radio link with a given subscriber module using the sector antenna 8, and a weightset of the second beamformer, which comprises phase shift values, is adapted to improve the signal quality received at the second receiver 3. For example, a perturbation algorithm may be used to perturb the phase of each element of the beamformer in turn, and the resulting signal quality, such as a signal to interference and noise ratio, may be measured at the output of the second receiver 3. Subsequently, once a satisfactory set of phase values has been found, the second beamformer and second receiver may be used to maintain the radio link with the given subscriber module using the adapted weightset, by connecting the second receiver 3 instead of, or in addition to, the first receiver 2 into the radio link. For example, a data stream from the second receiver may be used to carry upstream data traffic from the subscriber module to a data network to which the subscriber module is connected instead of the data stream from the first receiver. This may be achieved by a digital switching arrangement. This process allows the weightset of the beamformer to be adapted by exploring states including states which may make reception worse without impacting maintenance of a radio link with a given subscriber module.

As shown in FIG. 7, an initial beam 22 may be formed by the beamforming arrangement 10. This may be formed by the second beamformer, which is connected in this example to the second receiver 3 with the selector switch 5 in the first state. The sector antenna is connected, in this state, to the first receiver 2 which may be used to receive a data stream from the subscriber module, and so maintain the radio connection with the subscriber module. As shown in FIG. 7, the initial beam 22 may be directed at the subscriber module 14, which is transmitting a signal 24 towards the access point 1. As can be seen, in this example, the initial beam may be arranged to point directly at the subscriber module, so that the maximum gain of the beam is used to receive the signal from the subscriber module. This may be achieved as a first approximation by adapting the weights, or phase controls, of the beamformer to give an increased, or maximised, signal strength at the second receiver. However, as shown in FIG. 7, there may be an interference source, such as a signal 25 from another subscriber module 26, which may, in this example, be communicating with a different access point. This signal may be received by the initial beam. In the example shown, it is received in a sidelobe of the initial beam. This may cause an unacceptable signal to noise plus interference ratio. Different weightsets, in this example phase settings, for the beamformer may be explored until an improvement is seen. An adapted beam 23, shown as a broken line in FIG. 7, may be found which gives a better signal to noise plus interference ratio. In the example shown, the interference 25 falls into a null in the adapted beam 23 pattern, so that although the gain in the direction of the subscriber module is reduced, the signal to noise plus interference ratio is improved.

It has been found that a beamformer with quite coarse quantisation of phase steps, for example having a quantisation step of 90 degrees (pi/2 radians), can give good performance by giving an improvement in signal to noise plus interference ratio over that which may be achieved using a sector antenna. For example, with 90 degree quantisation, it has been found that the loss of signal to noise plus interference ratio due to quantisation effects may be less than 0.8 dB compared to infinite quantisation. However, with such coarse quantisation, a change in the weightset may cause a much worse signal to noise plus interference ratio at a receiver, so it has been found to be beneficial to use the sector antenna for reception of a data stream from a subscriber module to a data network while weightsets are being explored or perturbed, so as to maintain the data link without interrupting a live service. Once a satisfactory weightset has been found, this may be used instead for live reception, by using the receiver connected to the beamformer to receive the data stream from the subscriber module. The changeover between receivers may be done between one receive timeslots allocated to the subscriber module and the next.

The control of the weightset adaptation may be performed by a controller, which may be referred to as a processor, which may comprise at least one data processor, and may comprise at least one memory including computer program code, and/or may comprise a logic array such as a Field Programmable Gate Array.

Figure 8:
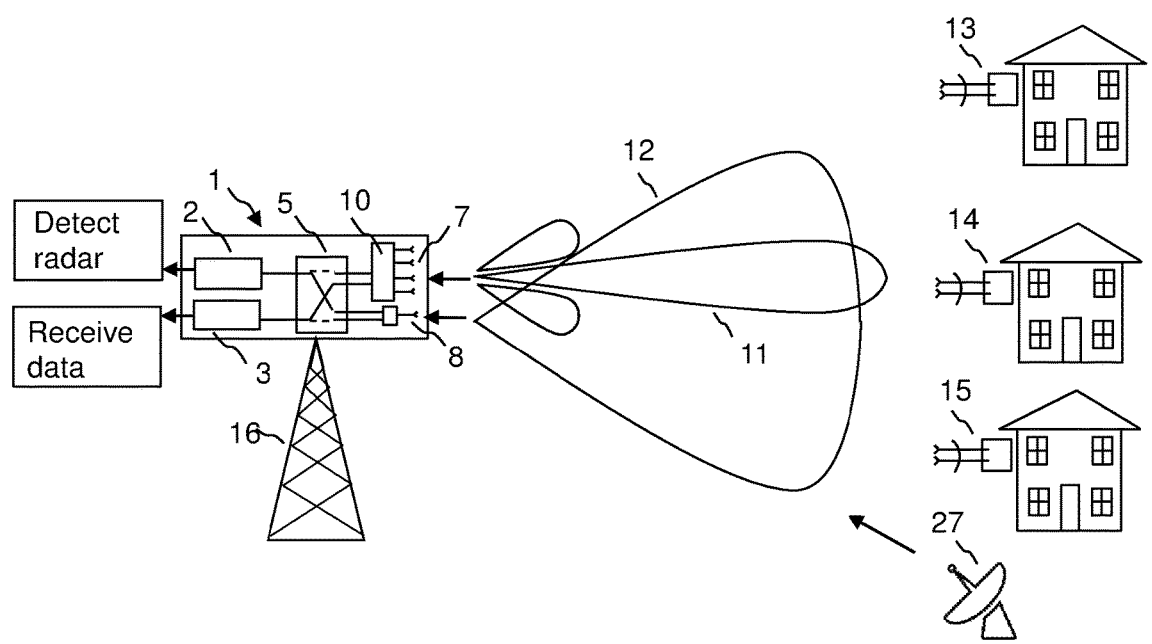
FIG. 8 is a schematic diagram showing an access point configured to detect radar using a sector antenna while receiving data using a beamformer in an embodiment of the invention.

FIG. 8 shows an embodiment of the invention, in which, while the selector switch is in the first state, radar is detected using the first receiver 2 while the second receiver 3 is configured to receive data from the given subscriber module using the second beamformer. The radar signals are received from a radar source 27 in the field of view of the sector antenna 8. Using the sector antenna 8 to detect radar allows a beamformer to steer a beam to a subscriber module to give good quality reception, while allowing reliable radar reception using the sector antenna 8 within a sector. Radar may be detected by applying an appropriate detection algorithm to the output of a receiver, according to regulatory requirements, for example dynamic Frequency Selection (DFS) requirements. For example, a certain power and pulse repetition frequency may be detected to identify a radar. If a radar is detected, appropriate re-tuning of transceivers in the wireless network may be performed to avoid interference with the radar.

The scheduler at the access point may control the selector switch, and control data routing from the appropriate receiver, to select the beamformer at either the first or second polarisation for reception of data, according to which polarisation is preferred for reception from a given subscriber module, and use the sector antenna at the other polarisation for radar detection. Satisfactory radar detection may be typically achieved at either polarisation.

At least one of the first and second receivers may be a superheterodyne receiver. This allows rejection of interference in the frequency domain which may be complementary to the rejection of interference in the spatial domain by means of the beamformer. For example, interference near the centre of the main beam of the beamformer may be rejected using the selectivity of the superheterodyne receiver to prevent blocking by a stronger interferer, to which a conventional direct conversion receiver is vulnerable, if the interference is at a different frequency than the wanted receive signal. In this case it would be difficult to adapt the beam to steer a null at the interference while maintaining the beam to the subscriber module.

The selector switch may be controlled by the scheduler at the access point to set the selector switch to a respective selected state for communication with a respective subscriber module, and to select an appropriate receiver for data reception for each respective subscriber module for each timeslot. So, either a beamformer or a sector antenna at either polarisation may be selected for a given timeslot for a given subscriber module under control of the scheduler.

Figure 9:
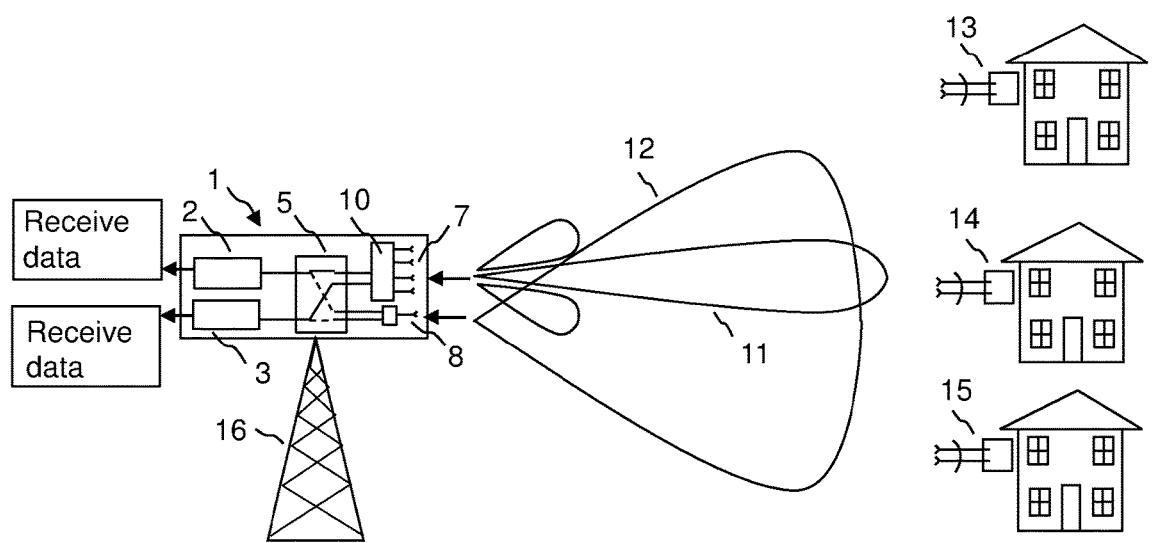
FIG. 9 is a schematic diagram showing an access point configured to receive data using a beamformer on each polarisation in an embodiment of the invention.

FIG. 9 illustrates a data reception mode, typically following an acquisition mode, in which the selector switch 5 is set to state in which both the first 2 and second 3 receivers are connected to the beamformer arrangement 10, so that the first receiver 2, for receiving on a first, for example V (vertical) polarisation, is connected to the first beamformer, and the second receiver 3, for receiving on a second, for example H (horizontal) polarisation, is connected to the second beamformer. This allows data to be received from a subscriber module on either or both polarisations.

Figure 10:
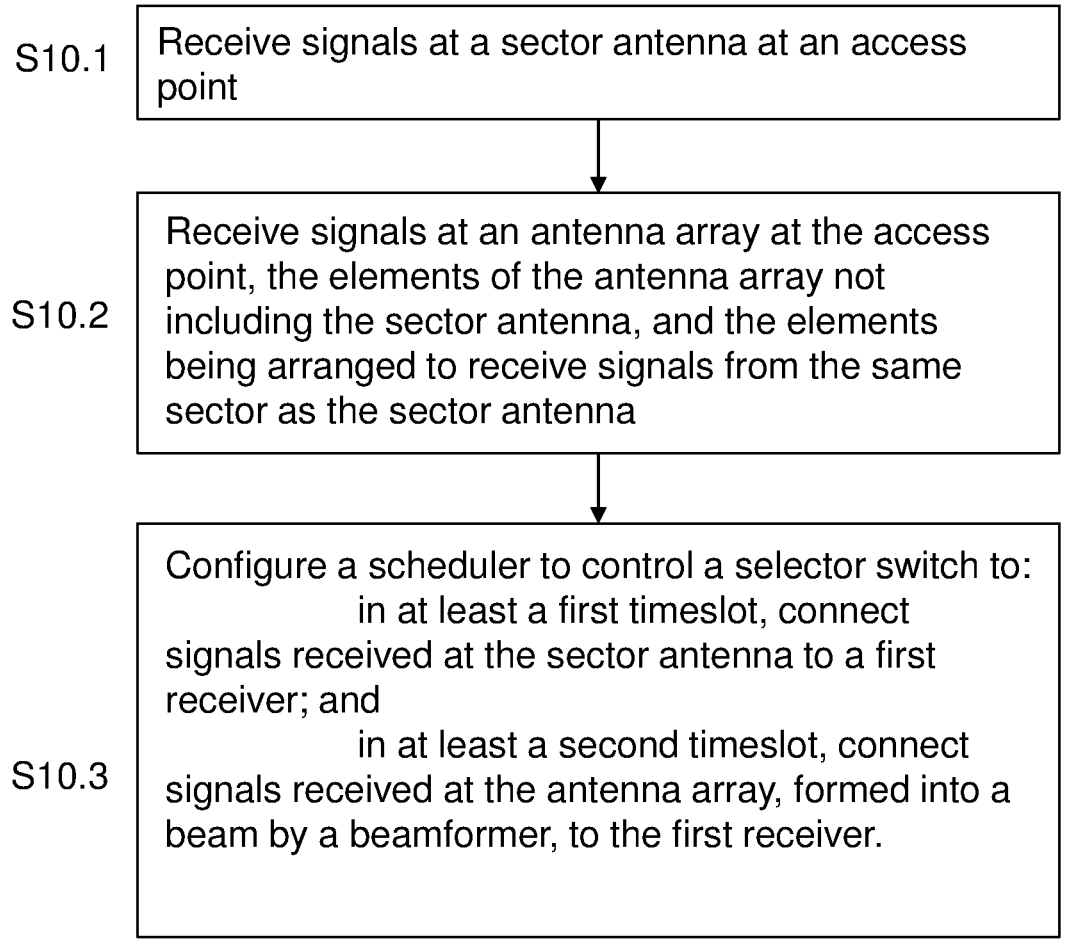
FIG. 10 is a flow diagram showing a method operating an access point according to an embodiment of the invention, in which a first receiver is switched between receiving from a sector antenna and receiving from a beamformer.

FIG. 10 is a flow diagram showing a method operating an access point according to an embodiment of the invention, in which a first receiver is switched between receiving from a sector antenna and receiving from a beamformer, according to steps S10.1, S10.2 and S10.3.

Figure 11:
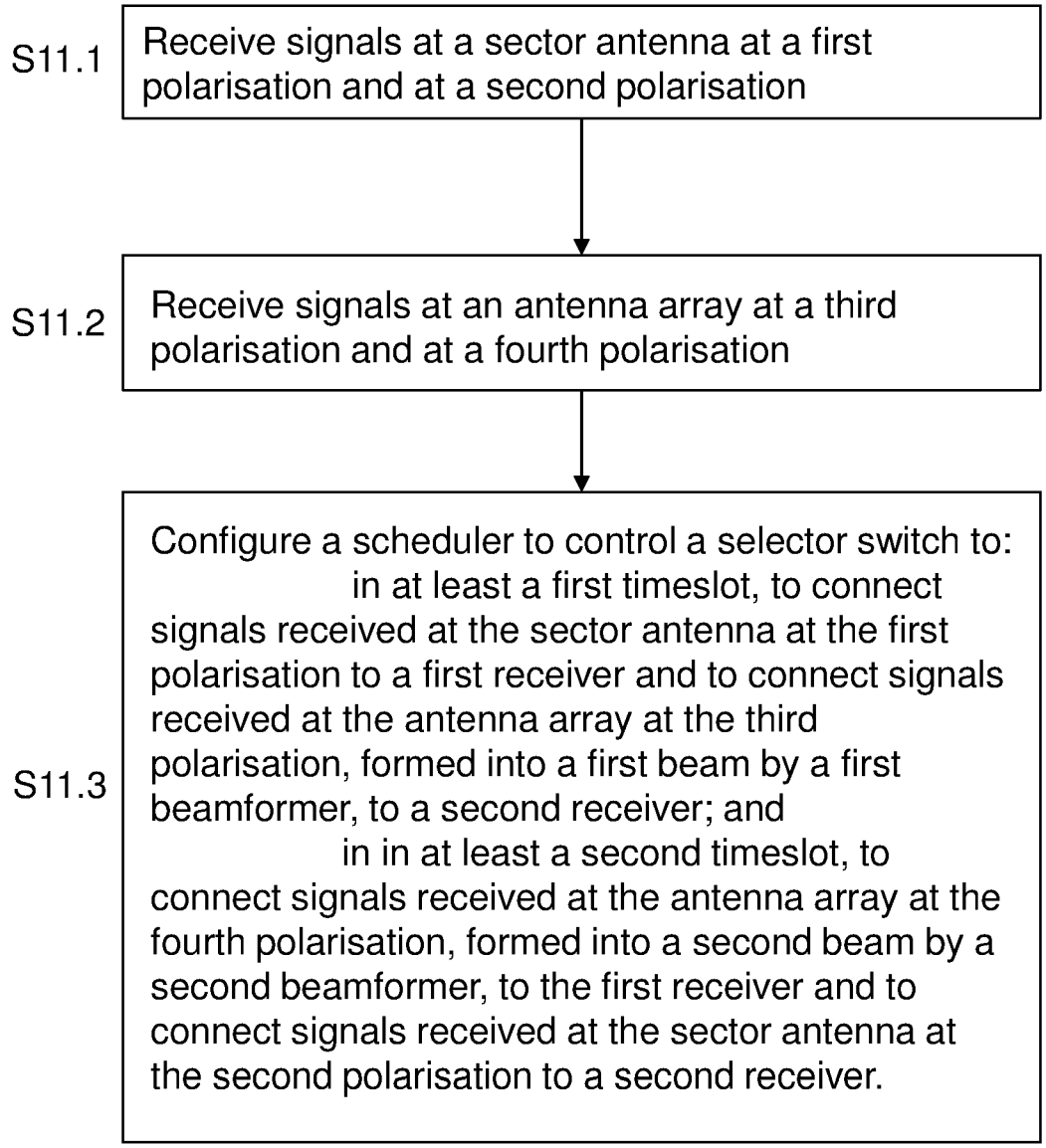
FIG. 11 is a flow diagram showing a method operating an access point according to an embodiment of the invention, for reception by a first receiver and a second receiver.

FIG. 11 is a flow diagram showing a method operating an access point according to an embodiment of the invention, for reception by a first receiver and a second receiver, according to steps S11.1, S11.2 and S11.3.

The above embodiments are to be understood as illustrative examples of the invention. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What we claim is:

1. An access point for use in a point to multipoint wireless network comprising the access point and a plurality of subscriber modules, the access point comprising:
    a sector antenna arranged to receive signals from a sector of an area of coverage of the access point at a first polarisation and at a second polarisation, different from the first polarisation;
    an antenna array of antenna elements, the antenna elements not including the sector antenna, and the antenna elements being arranged to receive signals from the same sector as the sector antenna at a third polarisation and at a fourth polarisation, different from the third polarisation;
    a first beamformer configurable to form a first beam from signals received at the antenna array at the third polarisation;
    a second beamformer configurable to form a second beam from signals received at the antenna array at the fourth polarisation;
    a selector switch switchable to at least a first state and a second state,
    wherein the selector switch is configured such that, in the first state of the selector switch, signals received at the sector antenna at the first polarization are connected to a first receiver and signals from the second beamformer are connected to the second receiver, and
    in the second state of the selector switch, signals received from the first beamformer are connected to the first receiver and signals received at the sector antenna at the second polarization are connected to the second receiver; and
    a scheduler configured to set the selector switch to the first state for at least a first receive timeslot and to set the selector switch to the second state for at least a second receive timeslot.

2. The access point of claim 1, wherein the first beamformer comprises a plurality of step-wise controllable phase shift arrangements, each phase shift arrangement being for controlling the phase and not amplitude of signals received from a respective antenna element of the antenna array.

3. The access point of claim 2, wherein each phase shift arrangement is controllable in steps of at least $\pi/4$ radians.

4. The access point of claim 2, wherein each phase shift arrangement is controllable in steps of $\pi/2$ radians.

5. The access point of claim 1, wherein the first receiver is a superheterodyne receiver.

6. The access point of claim 1, wherein the first polarisation is the same as the third polarisation, and the second polarisation is the same as the fourth polarisation.

7. The access point of claim 1, wherein the first polarisation is orthogonal to the second polarisation.

8. The access point of claim 1, wherein the second beamformer comprises a plurality of step-wise controllable phase shift arrangements, each phase shift arrangement being for controlling the phase and not amplitude of signals received from a respective antenna element of the antenna array.

9. A method of operating an access point in a point to multipoint wireless network comprising the access point and a plurality of subscriber modules, the access point comprising a first beamformer and a second beamformer, the method comprising:
    receiving signals at a sector antenna from a sector of an area of coverage of the access point at a first polarisation and at a second polarisation, different from the first polarisation;
    receiving signals at an antenna array of antenna elements, the antenna elements not including the sector antenna, the antenna elements being arranged to receive signals from the same sector as the sector antenna at a third polarisation and at a fourth polarisation, different from the third polarisation;
    configuring the first beamformer configurable to form a first beam from signals received at the antenna array at the third polarisation;
    configuring the second beamformer to form a second beam from signals received at the antenna array at the fourth polarisation;
    setting a selector switch to first state for at least a first receive timeslot and setting the selector switch to the second state for at least a second receive timeslot,
    wherein, in the first state of the selector switch, signals received at the sector antenna at the first polarisation are connected to a first receiver and signals from the second beamformer are connected to a second receiver, and
    in the second state of the selector switch, signals received from the first beamformer are connected to the first receiver and signals received at the sector antenna at the second polarisation are connected to the second receiver.

10. The method of claim 9, comprising forming at least the first beam by applying a plurality of step-wise controllable phase shifts, each phase shift controlling the phase and not the amplitude of signals received from a respective antenna element of the antenna array.

11. The method of claim 10, comprising controlling each respective phase shift in steps of at least $\pi/4$ radians.

12. The method of claim 10, comprising controlling each respective phase shift in steps of $\pi/2$ radians.

13. The method of claim 9, comprising:
    rejecting interference at the output of a beamformer in the frequency domain by means of a superheterodyne receiver.

14. The method of claim 9, wherein the first polarisation is the same as the third polarisation, and the second polarisation is the same as the fourth polarisation.

15. The method of claim 9, wherein the first polarisation is orthogonal to the second polarisation.

16. The method of claim 9, comprising, in the first receive timeslot, configuring the first receiver to maintain a radio link from a given subscriber module to a data network and adapting a weightset of the second beamformer to improve the signal quality received at the second receiver.

17. The method of claim 16, comprising, in the second receive timeslot, configuring the second receiver to maintain a radio link from the given subscriber module to a data network, and adapting a weightset of the first beamformer to improve the signal quality received at the first receiver.

18. The method of claim 16 comprising, in a subsequent receive timeslot for signals from the given subscriber module, setting the selector switch to connect the first beamformer to the first receiver and the second beamformer to the second receiver.

19. The method of claim 9, comprising, while the selector switch is in the first state, detecting radar using the first receiver while the second receiver is configured to receive data from the given subscriber module using the second beamformer.

* * * * *